United States Patent
Roche et al.

(10) Patent No.: US 6,774,562 B2
(45) Date of Patent: Aug. 10, 2004

(54) ENAMEL COMPOSITION FOR DIELECTRIC LAYERS, WHITE PIGMENTS WITH IMPROVED WETTABILITY CONTAINED THEREIN AND PLASMA DISPLAY PANEL CONTAINING THE DIELECTRIC LAYER

(75) Inventors: Guy Roche, Isle (FR); Annette Gorse, Limoges (FR)

(73) Assignee: dmc² Degussa Metals Catalysts Cerdec AG, Frankfurt am Main (DE)

( * ) Notice: Subject to any disclaimer, the term of this patent is extended or adjusted under 35 U.S.C. 154(b) by 385 days.

(21) Appl. No.: 09/736,365

(22) Filed: Dec. 15, 2000

(65) Prior Publication Data

US 2003/0050172 A1 Mar. 13, 2003

(30) Foreign Application Priority Data

Dec. 16, 1999 (EP) .............................. 99403161

(51) Int. Cl.⁷ ................................ H01J 17/49
(52) U.S. Cl. ...................... 313/582; 313/586; 313/587; 106/48; 106/312; 501/14; 501/17
(58) Field of Search ................ 313/582, 586, 313/587, 495; 106/48, 312; 501/14, 17, 18, 22, 23

(56) References Cited

U.S. PATENT DOCUMENTS 3,836,373 A * 9/1974 Ault et al. .................. 106/312

5,909,083 A    6/1999   Asano et al. ................ 313/584
5,948,537 A    9/1999   Onoda et al. ................ 428/426
6,137,226 A * 10/2000   Nagano ....................... 313/582

FOREIGN PATENT DOCUMENTS

EP    0 779 243    6/1997
GB    327142    3/1930

* cited by examiner

Primary Examiner—Nimeshkumar D. Patel
Assistant Examiner—Mariceli Santiago
(74) Attorney, Agent, or Firm—Wenderoth, Lind & Ponack, L.L.P.

(57) ABSTRACT

The invention refers to an enamel composition for producing reflecting dielectric layers in plasma display panels, comprising as layer forming constituents 70 to 97% by wt. of a glass frit composition and 3 to 30% by wt. of a particulate whitening material. The whitening material comprises one or more thermally deactivated white pigments, which have been made by a process comprising heating of at least one white pigment in the absence or presence of a glass frit having a softening temperature of less than 600° C. at a temperature of 600 to 1000° C. for 0,1 to 10 hours.

The invention further refers to a method for improving the wettability of white pigments by the above said thermal treatment.

The enamel is used for producing a reflecting white dielectric layer in plasma display panels.

17 Claims, 2 Drawing Sheets

ENAMEL COMPOSITION FOR DIELECTRIC LAYERS, WHITE PIGMENTS WITH IMPROVED WETTABILITY CONTAINED THEREIN AND PLASMA DISPLAY PANEL CONTAINING THE DIELECTRIC LAYER

TECHNICAL FIELD OF THE INVENTION

The present invention relates to an enamel composition for producing a reflecting white dielectric layer in plasma display panels. The invention further relates to white pigments with improved wettability which pigments are present in the enamel composition. The invention still further relates to a process for enamelling a glass substrate for producing a reflecting dielectric layer with improved properties in plasma display panels and plasma display panels containing said reflecting dielectric layer.

BACKGROUND OF THE INVENTION

A plasma display panel generally comprises two opposed glass substrates, electrodes systematically arranged in the glass substrates and a noble gas there between. More particularly a plasma display panel (PDP) comprisis a first array of electrodes embedded in a dielectric layer on the rear glass substrate, a second array of electrodes embedded in a dielectric layer on a front substrate and a pattern of a barrier for defining discharge spaces in between.

The structure and a process for producing a plasma display panel (PDP) is described in the U.S. Pat. No. 5,909,083. This document also discloses the composition of transparent and pigmented enamels such as used for a primer layer to be dispositied on glass substrate, a dielectric layer which covers the address electrode and several compositions for producing the barrier system. The dielectric layer forming constituents essentially comprise a glass frit, based on e.g. $Bi_2O_3$, $SiO_2$, ZnO and $B_2O_3$, and a pigment like titanium dioxide and in addition thereto aluminium oxide. The mixture of said inorganic ingrediences has a softening temperature of 570° C., and the fired enamel has a coefficient thermal expention $\alpha=80 \cdot 10^{-7}$ $K^{-1}$. For screen printing purposes the said enamel composition further contains a medium comprising a resin binder and an organic solvent system.

The U.S. Pat. No. 5,948,537 relates to a non-cristylizable low melting glass compositions based on 52 to 68 wt.-% of $PbO+Bi_2O_3$, 14 to 28 wt.-% of $B_2O_3$ and 6 to 23 wt.-% of ZnO and facultatively small amounts of $SiO_2$, $Al_2O_3$, $CeO_2$ and $SnO_2$. Said glass composition has a softening point of at most 510° C. and a thermal expansion coefficient $\alpha_{20}^{300}$ of 70 to $85 \cdot 10^{-7}$ $K^{-1}$. This document is silent about the use of pigments within the dielectric layer. Other glass compositions for dielectric glass layers in PDP's consist of (wt.-%) 55 to 70 PbO, 6 to 25 $B_2O_3$, 6 to 25 $SiO_2$, 1 to 10 ZnO, 1 to 5 $K_2O$, $Cr_2O_3$, CuO, NiO, MnO, CoO or vanadium oxide—see JP 10208644 A. A glass frit on the basis of a lead borosilicate containing (wt.-%): 62,4 to 69,6 PbO, 5,8 to 13,6 $SiO_2$, 13,6 to 20 $B_2O_3$, 0,2 to 1 $Al_2O_3$, 0 to 5 MgO and 0 to 6 CaO for dielectric layers for PDP's is tought by JP-A 50-23414.

A glass frit composition for a dielectric layer in PDP's must fit several kind of specifications: Physical specifications like high compatability with glass panels, an essentially complete (>99%) coating at a firing temperature of preferably 550 bis 580° C.; optical specification like a reflection coefficient as great as possible to improve the luminance; electrical specification like a break down voltage greater than 400 V/25 $\mu$m. The glass frit compositions of the above cited documents do not fully meet the required properties in the one or other aspect. This happens especially in those cases where the glass composition contains a white pigment for providing the dielectric layer with a high reflection coefficient. One important problem the skilled has to cope with in using enamel compositions containing white pigments for producing dielectric layers for PDP's is the porosity of said layers obtained by firing. The high porosity is most probably caused by the bad wetting properties of the pigments by the glass matrix. The quality of the reflecting dielectric layer for PDP's can be checked by light microscope observation and by sweep electron microscope observation—insufficient quality is characterized by an uneven surface aspect, a high number of bubbles and inhomogeneity of the micro structure.

SUMMARY OF THE INVENTION

It is a first object of the present invention to provide an enamel composition for producing a reflecting white dielectric layer for plasma display panels with improved properties, like especially a very low number of bubbles within the fired dielectric layer. Further objects of the invention are directed to provide a method for improving the wettability of white pigments for using them in an enamel composition for use in PDP's and a process for the production of glass layers with a porosity which is significantly lower than obtained by using conventional pigments. Further object of the invention can be seen from the following disclosure.

DISCLOSURE OF THE INVENTION

Figure 1:
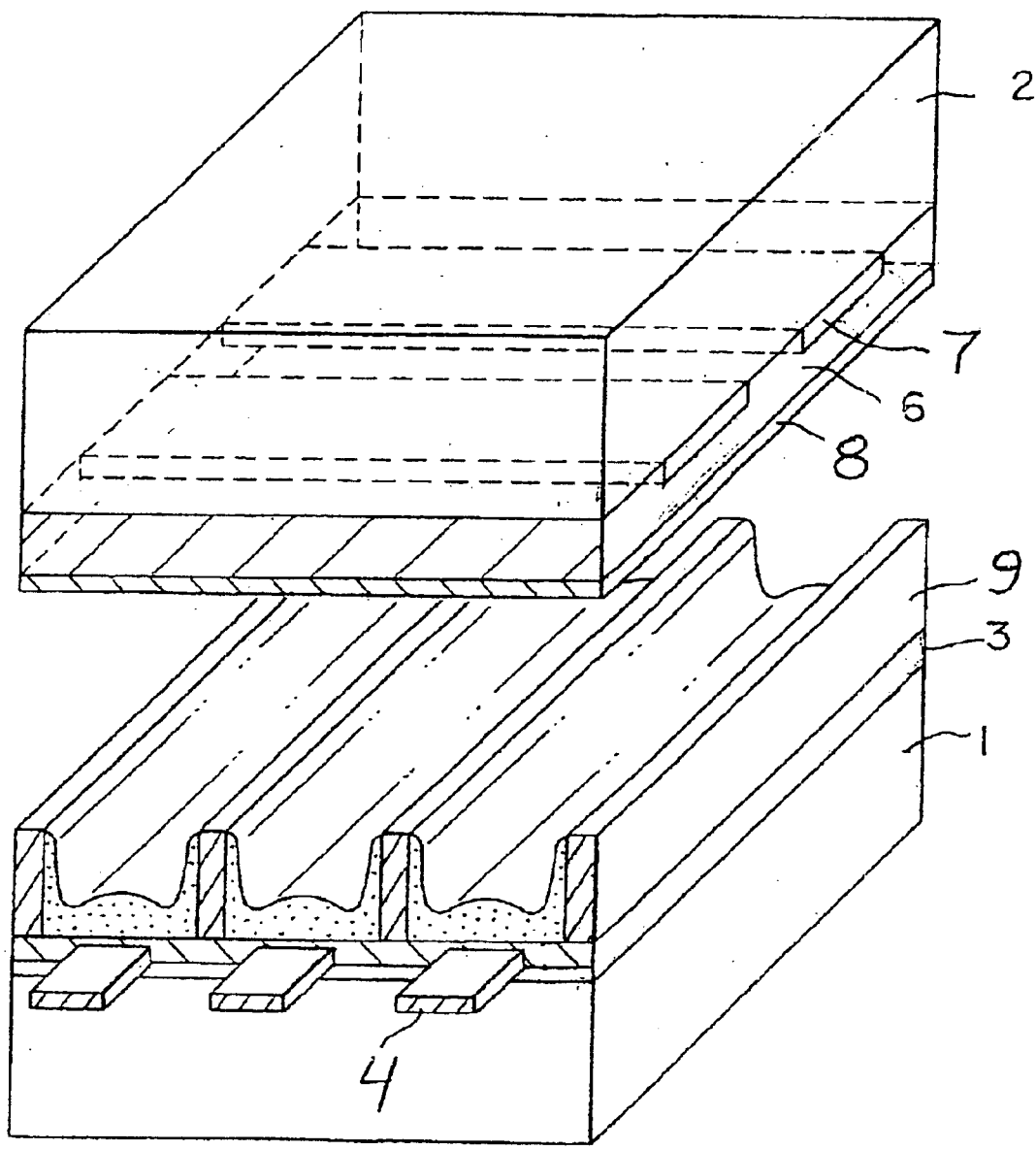
FIG. 1 is a perspective view of the PDP of the present invention.

It has been found that the above stated object can be solved by using white pigments having an improved wettability whereby said improvement is achieved by a method comprising a heat treatment of a white pigment in the absence or presence of a low melting glass frit at 600 to 1000° C. It has been found that heat treatment leads to a changement of the morphology of the pigment whereby the wettability is improved. By said heat treatment the specific area of a pigment is reduced and the mean partical size is increase. The thermally treated pigment is called "deactivated pigment" whereby this term includes uncoated pigments as well as pigments which may be at least partially coated with a low melting glass composition. In the latter embodiment the deactivation takes place by the coating with or without changing the morphology.

Therefore, the first object of the invention is solved by an enamel composition for producing reflecting dielectric layers in plasma display panels, comprising as layer forming constituants 70 to 97% by wt. of a glass frit composition having a softening temperature of less than 600° C. and 3 to 30% by wt. of a particulate whitening material, which is characterized in that the whitening material consists of at least 50% by wt. of one or more thermally deactivated white pigments, 0 to 50% by wt. of other white pigments and 0 to 20% by wt. of one or more opacifiers and whereby the one or more thermally deactivated white pigments have been made by a process comprising heating of at least white pigment in the absence or presence of a glass frit having a softening temperature of less than 600° C. at a temperature of 600 to 1000° C. for 0,1 to 10 hours. The sub-claims are directed to prefered embodiments of the inventive enamel composition.

The enamel composition contains 70 to 97% by wt., preferably 75 to 90% by wt. and most preferred 80 to 90% by wt. of a low melting glass frit composition. The glass frit composition may be comprised of one or more glass frits, and the specified quantity includes also the glass frit by which according to one embodiment of the invention the thermally deactivated white pigment can be coated. The term "coated" includes partially and essentially fully coated pigment particles. Usually coated pigments contain up to 50% by wt., preferably 20 to 40% by wt. of a glass frit having a softening temperature of a less then 600° C.

It is an important feature of the inventive enamel composition that the combination of all glass frits contained therein has a softening temperature of less then 600° C., preferably less then 560° C. and most preferred a softening temperature in the range of 390 to 520° C. The said softening temperature $T_s$ refers to a measurement using a Chevenard-dilatometer. At said temperature $T_s$ the glass frit becomes fluid and melts. According to a preferred embodiment the glass frit composition of a coated pigment is equal or similar to the main part of the glass frit in the enamel composition.

In order to fully meet the electrical specification of the reflecting dielectric layer it is necessary, that a glass layer made by firing said glass frit composition has a break-down voltage greater than 400 V/25 $\mu$m, preferably at least 1000 V/25 $\mu$m and most preferred equal or greater than 1500 V/25 $\mu$m.

Although there are known several types of low melting glass frits for the respective application it has been found that a glass frit based on a lead borosilicate with a very low content of alcali metal oxide and/or earth alcali metall oxides are most preferred. A typical composition for such a glass frit which forms the matrix of the dielectric layer consists essentially of (% by wt.): 55 to 90 PbO, 6 to 35 $B_2O_3$, 6 to 40 $SiO_2$, 0,1 to 2 CaO and/or BaO and 0,1 to 2 $Na_2O$ and/or $K_2O$. Such compositions have a softening temperature in the range of 390 to 520° C. and a thermal expansion coefficient $\alpha_0^{300}$ of (60 to 90)·$10^{-7}$ $K^{-1}$. Such preferred glass composition can be used not only for the inventive pigmented dielectric layers for plasma display panels but also for producing transparent glass layers which are used for embedding an array of electrodes on the back side of the front glass plate of a plasma display panel. It is an essential advantage of the said glass frit composition that the glass layer made therefrom has a very high break-down voltage, which usually is around 2000 V/25 $\mu$m.

The enamel composition contains 3 to 30% by wt. and preferably 10 to 25% by wt. of a particulate whitening material. Although said whitening material may comprise a limited quantity of standard inorganic white pigments it is most preferred that the inventive enamel composition contains all white pigments in the form of thermally deactivated pigments. Examples for white pigments are titanium dioxide in the form of rutile and anatase, tinoxide, zirconium silicate and barium sulfate. The most preferred white pigments are commercially available titanium dioxide pigments whereby the rutile gives a slightly yellow tint and the anatase a slightly blue tint.

It has been found that by thermally deactivating such pigments the wettability of the pigments with respect to a glass matrix is substantially improved. As already said, it is suspected that the pigment surface is deactivated by thermally treating of the pigment in the presence of or absence of a glass frit. It has also been found, that the specific area of a white pigment decreases and the mean partical size increases during the thermal treatment of the pigment at a temperature in the range of 600 bis 1000° C. or even above the upper and below the lower limit of temperature. The heat treatment should not be performed at a too high temperature during a too long time in order to avoid a stoichiometric change of the pigment and thereby reduce the whiteness. Usually the heat treatment should be performed in the temperature range of 600 to 1000° C., preferably 600 to 800° C.

The heat treatment of the white pigment for deactivating can, as disclosed above, be performed by simply heating the pigment at the temperature of 600 bis 1000° C. for 0,1 to 10 hours, preferably 0,3 to 3 hours. According to a preferred embodiment of this treatment process the white pigment is first transferred into briquettes; after the heat treatment of said briquettes they are crushed, e.g. by any milling process or the like, to fine particles. The fineness of such deactivated white pigments usually corresponds to an average particle size in the range of 0,5 to 5 $\mu$m, preferably 1 to 3 $\mu$m.

According to an alternative embodiment of the invention the thermal deactivation of the white pigment is performed by heating a mixture of a low melting glass frit and the white pigment. The heating temperature and the heating time correspond essentially to the conditions used for the diactivation of the pigment alone. According to a preferred method for deactivating a white pigment the method comprises the steps: (i) preparing a homogeneous powder mixture of a white pigment to be coated and a glass frit having a softening temperature of less than 600° C., (ii) transferring the mixture into briquettes, (iii) heating said briquettes at a temperature of 600 to 1000° C., preferably 600 to 800° C. for 0,1 to 10 hours, preferably 0,3 to 3 hours and (iv) crushing the so treated briquettes. A preferred powder mixture consists of at least 50% by wt. of a white pigment and up to 50% by wt. of a glass frit; an especially preferred mixture consists of 60 to 80% by wt. of the pigment and 20 to 40% by wt. of the glass frit. The term "briquette" includes any kind of mouldings obtained by any pressing or granulating process. The mixing step (step i) is best performed by milling the pigment and the glass frit together whereby the milling process can be performed in the presence or absence of an organic solvent. The optimum temperature for the heating process and the heating time depend on the ratio glass/pigment and the fusibility of the glass matrix. The heat treatment can be made in any static or continuous oven. The obtained very compact lozenge can be first crushed and afterwards milled with the main part of the glass frit of the enamel composition (the other part of the glass frit corresponds to the coat of the deactivated pigment).

The reflection properties of the inventive enamel composition can in some cases further be improved by the addition of an opacifying agent, such as an MgO, $Al_2O_3$, some kinds of silicates, like micas, and ceramic glazes. Although such components can improve the reflective properties the presence is limited to 20% of the whitening material and more preferably 5% of the whitening material because said compounds are often very refractory and therefore may demage the surface aspect.

The inventive enamel composition may contain in addition to the layer forming constituants a liquid or thermoplastic printing medium. Preferred liquid enamel compositions comprise 60 to 80% by wt. of layer forming constituants and 40 to 20% by wt. of a liquid printing medium. The essential constituents of a printing medium are a polymer binder and at least a solvent system. The solvent system can be aqueous or organic, and the skilled in the art is familiar with the election of such compounds. It is necessary that the solvents are evaporatable and the polymer fully decomposable during the firing process. A typical aqueous printing medium essentially consists of hydroxypropyl cellulose, dipropylene glycol and water. A typical organic medium consists essentially of ethyl cellulose and pine oil. Of course, any printing medium as disclosed in any of the above cited documents can also be used.

As already described above in connection with the disclosure of the enamel composition the invention also includes a method for improving the wettability of white pigment for using them in an enamel composition for PDP's.

A further object of the invention is directed to a process for enamelling a glass substrate in order to get a reflecting dielectric layer on it. The process comprises usual steps which the skilled in the art is familiar with. Most usually an enamel composition consisting essentially of glass layer forming constituants dispersed in a liquid or thermoplastic medium is first printed on the substrate.

As far as necessary solvents are evaporated and the printing process is repeated several times in order to get the necessary thickness of the layer to be fired. The firing takes place at a temperature sufficiently below the strain temperature of the glass substrate and depending on the softening temperature of the enamel composition. Usually the firing temperature is in the range of 550 to 680° C. but, of course, a lower firing temperature is possible provided the enamel composition has a softening temperature significantly below 600° C., like below 520° C. or preferably below 500° C. This inventive process is characterized in that the inventive enamel composition is being used.

A further object of the invention is a plasma display panel comprising a first array of electrodes embedded in a dielectric layer on a rear substrate, a second array of electrodes embedded in a dielectric layer on a cover substrate (front plate) and a pattern of a barrier for defining discharge spaces in between of the rear and a front substrate; the inventive PDP is characterized in that the dielectric layer of the rear substrate is a reflecting, essentially white dielectric enamel made by coating the rear substrate with an enamel composition according to the invention and firing the coated substrate at a temperature in a range of 500 to 680° C., preferably 540 to 580° C. Details for producing PDP's can be taken out of the cited documents.

Figure 2:
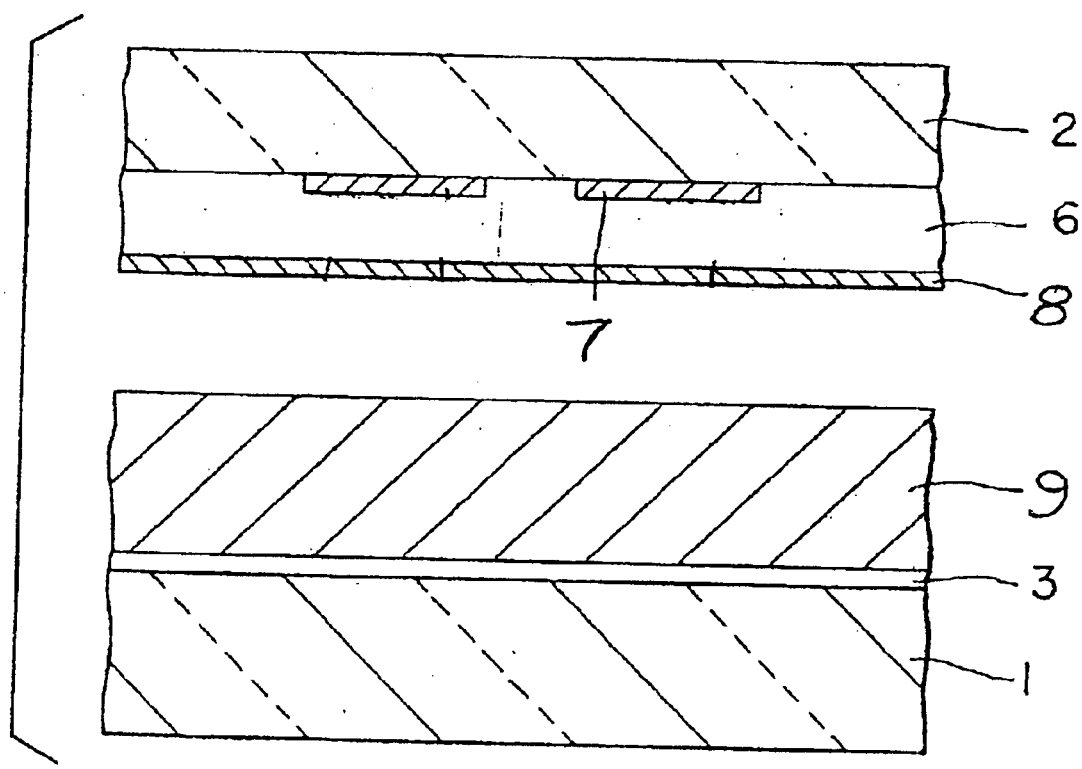
FIG. 2 is a side elevation view of the PDP of the present invention.

Referring to FIGS. 1 and 2, the outer surfaces of the PDP comprise a rear substrate 1 and a cover substrate 2. The rear substrate 1 is overlaid with a first dielectric layer 3 through which a first array of parallel electrodes 4 is embedded. The first dielectric layer 3 comprises a white enamel. The cover substrate 2 is overlaid with a second dielectric layer 6 through which a second array of parallel electrodes 7 is embedded. An opacifying layer 8 overlies the second dielectric layer 6. The rear substrate 1 and cover substrate are arranged such that the first 3 and second 7 arrays of parallel electrodes are orthogonal to one another. Overlaying the dielectric layer 3 is a pattern of a barrier 9 for defining spaces between the rear substrate 1 and the cover substrate 2 in which discharge occurs.

The inventive enamel composition and the dielectric layer made therefrom are characterized by the fact that they contain a deactivated white pigment. By deactivating the white pigment in the frame of the process of producing the enamel composition the wettability of the pigment could be significantly increased and thereby the properties of the fired dielectric layer could significantly be improved. The invention comprises several alternatives for deactivating the white pigments. It is possible to select the best deactivating process and a specific enamel composition to achieve a well reflecting dielectric layer with optimum compatibility with the glass panel, high density of the layer, that means essentially free of enclosed bubbles, high reflection coefficient and good electrical properties like a high break-down voltage. It was not forseeable that by a simply deactivating the white pigment it was possible to achieve the improvement of the properties of dielectric layers for use in plasma display panels.

EXAMPLES

Examples 1.1 to 1.9

Process for deactivating oxidic pigments in the absence of a glass frit. The oxide is agglomerated by pressing the pigment powder into briquettes of 2 cm spuare pressed under 100 $N/cm^2$. The briquettes are then heat-treated. Table 1 shows the tested pigments, the heat treatment conditions and some properties.

TABLE 1

| No. | Pigment | T (° C.) | t (hrs) | mean particle size $d_{50}$ ($\mu$m) | specific area ($m^2/g$) | remarks |
|---|---|---|---|---|---|---|
| 1.1 | $TiO_2$ (anatase) | — | — | 0.5 | 19.6 | white |
| 1.2 | | 800 | 1 | 1.3 | 12 | white |
| 1.3 | | 1000 | 1 | 9.3 | 5.6 | white |
| 1.4 | | 1200 | 1 | 22.1 | 1.7 | slight yellow |
| 1.5 | $TiO_2$ (rutile) | 800 | 1 | 2.1 | 9.1 | slight yellow |
| 1.6 | $TiO_2$ (rutile | 1000 | 1 | 8.6 | 6.4 | slight yellow |
| 1.7 | $SnO_2$ | | | 1.5 | 10 | white grey |
| 1.8 | $CeO_2$ | | | 1.8 | 12 | brown white |
| 1.9 | $ZrSiO_4$ | | | 5.2 | 2.5 | white grey |

Examples 2.1 to 2.11

Process for deactivating oxidic pigments in the presence of a glass frit. Mixing a glass frit with the pigment in isopropanol in a ball mill. Drying in a static oven. Pressing the powder mixture into briquettes; heat-treatment of the briquettes; milling. Table 2 shows the conditions. Glass frit A has a softening temperature of 420° C. and consists of (% by wt.): $SiO_2$ 5,8%, $B_2O_3$ 14,8%, PbO 73,2%, $Na_2O$ 0,1%, $K_2O$ 1,1%. Glass frit B has a softening temperature of 440° C. and consists of (% by wt.): $SiO_2$ 6%, $B_2O_3$ 23%, PbO 71%. Glassfrit C has a softening temperature of 470° C. and consists of (% by wt.) $SiO_2$ 6%, $B_2O_3$ 34% and PbO 60%

TABLE 2

| No. | Pigment | Glass frit | Pigment/ Glass frit ratio | T (° C.) | t (hrs) | deactivated pigment $d_{50}$ ($\mu$m) | remarks |
|---|---|---|---|---|---|---|---|
| 2.1 | $TiO_2$ (anatase) | A | 20:80 | 450 (° C.) | 1 h | 3.5 | slightly linked |

TABLE 2-continued

| No. | Pigment | Glass frit | Pigment/ Glass frit ratio | T (° C.) | t (hrs) | deactivated pigment d₅₀ (μm) | remarks |
|---|---|---|---|---|---|---|---|
| 2.2 | TiO₂ (anatase) | A | 20:80 | 540 (° C.) | 1 h | 5.2 | white; linked |
| 2.3 | TiO₂ (anatase) | A | 50:50 | 600 (° C.) | 1 h | 4.1 | white; linked |
| 2.4 | TiO₂ (anatase) | A | 50:50 | 800 (° C.) | 1 h | 5.2 | white; linked |
| 2.5 | TiO₂ (anatase) | A | 50:50 | 900 (° C.) | 1 h | 6.5 | white-grey; difficult to crush |
| 2.6 | TiO₂ (anatase) | A | 50:50 | 1000 (° C.) | 1 h | — | very difficult to crush |
| 2.7 | TiO₂ (rutile) | A | 30:70 | 450 (° C.) | 1 h | 3.7 | white |
| 2.8 | TiO₂ (rutile) | A | 40:60 | 600 (° C.) | 1 h | 4.1 | white; linked |
| 2.9 | TiO₂ (rutile) | B | 40:60 | 600 (° C.) | | 3.9 | white easy to mill |
| 2.10 | TiO₂ (rutile) | C | 40:60 | 600 (° C.) | 1 h | 3.5 | white |
| 2.11 | TiO₂ (rutile) | C | 40:60 | 800 (° C.) | 1 h | 4.6 | slightly yellow |

Example 3. to 3.12

General process for preparing the enamel composition. The glass frit (typ A composition $SiO_2$ 5,8, $B_2O_3$ 14,8, PbO 73,2, $Na_2O$ 0,5 or type B composition $SiO_2$ 6, $B_2O_3$ 23, PbO 71) is milled in isopropanol (20 g for 100 g of glass frit) up to a mean particle size in the range of 3 to 5 μm. The deactivated pigment, pure or coated with a glass coat and opacifiers are added during milling in order to get a homogeneous mixture. The whole is then dried.

The mixture of the glass layer forming constituents is then pasted in the usual manner by using a standard aqueous or organic medium for screen printing purposes in a quantity of approx 23–25% by wt.:

the aqueous medium is composed of hydroxyethyl cellulose 10%, dipropylene glycol 30% and water 60%, the organic medium is composed of elhyl cellulose 3% and pine oil 97%.

Table 3 shows the compositions

TABLE 3

| No. | glass frit Type/ quantity (% by wt.) | deactivated pigment Type (product of example no.)/ quantity (% by wt.) | opacifier Type/ quantity (% by wt.) | medium Type |
|---|---|---|---|---|
| 3.1 | A/60% | 1.1/15% | — | org./25 |
| 3.2 | A/67.5% | 1.2/7.5% | — | org/25 |
| 3.3 | A/60 | 1.2/15% | — | org/25 |
| 3.4 | A/56.25 | 1.2/18.75% | — | org/25 |
| 3.5 | B/63.75 | 1.2/11.25% | — | org/25 |
| 3.6 | B/63.75 | 1.6/11.25% | — | org/25 |
| 3.7 | B/52.50 | 2.3/22.50% | — | org/23 |
| 3.8 | B/52.50 | 2.8/22.50% | — | org/23 |
| 3.9 | B/52.50 | 2.9/22.50% | — | org/23 |
| 3.10 | A/60 | 1.2/15% | Aluminia 2 | org/23 |
| 3.11 | A/60 | 1.2/15% | mica 2 | org/23 |
| 3.12 | A/60 | 1.2/15% | — | aq/25 |
| 3.13 | B/67.5 | 1.7/7.5 | — | org/25 |
| 3.14 | B/67.5 | 1.8/7.5 | — | org/25 |
| 3.15 | B/67.5 | 1.9/7.5 | — | org/25 |

Example 4.1 to 4.10

Method for producing a dielectric layer: Enamel compositions according to examples of table 3) have been screen printed on a glass substrate. The thickness was around 25 μm. After drying the printing process has been repeated twice; the system has been fired.

Firing conditions and properties of the reflecting dielectric layer can be seen from table 4.

TABLE 4

| No. | Enamel composition No. | T (° C.) | t (hrs) | break-down voltage (V/25 μm) 1) | reflection coefficient % at 440 nm 2) | Density 3) |
|---|---|---|---|---|---|---|
| 4.1 | 3.1 | 580 | 1 | 850 | 60 | -- |
| 4.2 | 3.2 | 580 | 1 | 820 | 40 | ++ |
| 4.3 | 3.3 | 580 | 1 | 810 | 55 | + |
| 4.4 | 3.4 | 580 | 1 | 830 | 60 | +- |
| 4.5 | 3.4 | 580 | 1,5 | 800 | 60 | + |
| 4.6 | 3.4 | 625 | 1 | 790 | — | + |
| 4.7 | 3.5 | 580 | 1 | 960 | 55 | ++ |
| 4.8 | 3.7 | 580 | 1 | 1020 | 50 | ++ |
| 4.9 | 3.8 | 580 | 1 | 990 | 50 | ++ |
| 4.10 | 3.9 | 580 | 1 | 1050 | 50 | ++ |
| 4.11 | 3.13 | 580 | 1 | not determined | not determined | --*) |
| 4.12 | 3.14 | 580 | 1 | | | --*) |
| 4.13 | 3.15 | 580 | 1 | | | --*) |

1) The breakdown voltage is given by a dielectric rigidity test. The machine used here is from SEFELEC. A growing tension is applied to the system of capacitors and the detection of a defect (corresponding to the breakdown voltage) is made by the measurements of the electric current passing through a resistor. An electronic memory allows to give the tension value at which the breakdown takes place. It is given in V/μm of thickness.
2) Determined by a Spectrocolorimeter ERIO JOHNE + REILHOFER, working as a reflectometer for the measurement of the spectral reflectance from 330 nm to 730 nm.
3) Presence of bubbles as observed by light microscope and by sweep electron microscope
++ very dense = hardly any or very small bubbles
+ dense = small number of bubbles
– moderate = moderate quantity of bubbles
-- low density = high number of bubbles
*) Damage of the surface: not white 1) The breakdown voltage is given by a dielectric rigidity test. The machine used here is from SEFELEC. A growing tension is applied to the system of capacitors and the detection of a defect (corresponding to the breakdown voltage) is made by the measurements of the electric current passing through a resistor. An electronic memory allows to give the tension value at which the breakdown takes place. It is given in V/μm of thickness.

2) Determined by a Spectrocolorimeter ERIO JOHNE+ REILHOFER, working as a reflectometer for the measurement of the spectral reflectance from 330 nm to 730 nm.

3) Presence of bubbles as observed by light microscope and by sweep electron microscope
++ very dense=hardly any or very small bubbles
+ dense=small number of bubbles
− moderate=moderate quantity of bubbles
−− low density=high number of bubbles
*) Damage of the surface: not white

What is claimed is:

1. Enamel composition for producing reflecting dielectric layers in plasma display panels, comprising as layer forming constituents 70 to 97% by weight of a glass frit composition having a softening temperature of less than 600° C. and 3 to 30% by weight of a particulate whitening material, characterized in that the whitening material consists of at least 50% by wt. of one or more thermally deactivated white pigments, 0 to 50% by wt. of other white pigments and 0 to 20% by wt. of one or more opacifiers and whereby the one or more thermally deactivated white pigments have been made by a process comprising heating of at least one white pigment in the absence or presence of a glass fit having a softening temperature of less than 600° C. at a temperature of 600 to 1000° C. for 0.1 to 10 hours.

2. Enamel composition according to claim 1, characterized in that the layer forming constituents comprise essentially 70 to 90% by wt. of a glass fit composition having a softening temperature of less than 560° C., 10 to 25% by wt. of a deactivated white pigment which can be coated with a glass fit and 0 to 5% by wt. of an opacifying agent.

3. Plasma display panels comprising a first array of electrodes embedded in a first dielectric layer on a rear substrate, a second array of electrodes embedded in a second dielectric layer on a cover substrate and a pattern of a barrier for defining discharge spaces in between, characterized in that the first dielectric layer on the rear substrate is a reflecting essentially white enamel made by coating the substrate with an enamel composition according to claim 2 and firing at a temperature in the range of 600 to 680° C.

4. Enamel according to claim 1, characterized in that the deactivated white pigment is made from titanium dioxide.

5. Plasma display panels comprising a first array of electrodes embedded in a first dielectric layer on a rear substrate, a second array of electrodes embedded in a second dielectric layer on a cover substrate and a pattern of a barrier for defining discharge spaces in between, characterized in that the first dielectric layer on the rear substrate is a reflecting essentially white enamel made by coating the substrate with an enamel composition according to claim 4 and firing and firing at a temperature in the range of 600 to 680° C.

6. Enamel composition according to claim 1, characterized in that the deactivated white pigment is made by a process, comprising transferring of a white pigment into briquettes, heating said briquettes at 600 to 1000° C. for 0.3 to 3 hours and crushing the so treated briquettes.

7. Enamel composition according to claim 1, characterized in that the deactivation of the white pigment is carried out by a process comprising (i) preparing of a homogeneous powder mixture of at least 50% by wt. of a glass frit having a softening temperature of less than 600° C., (ii) transferring the mixture into briquettes, (iii) treating said briquettes at 600 to 800° C. for 0.3 to 3 hours and (iv) crushing the thermally treated briquettes.

8. Enamel composition according to claim 1, characterized in that a glass layer made from said enamel composition by coating and firing has a breakdown voltage of greater than 400 V/25 $\mu$m.

9. Enamel composition according to claim 1, characterized in that the glass frit composition is based on a lead borosilicate glass, essentially containing (wt.-%) PbO from 55 to 90%, $B_2O_3$ from 6 to 35%, $SiO_2$ from 6 to 40%, CaO and BaO from 0.1 to 2% and $Na_2O$ and $K_2O$ from 0.1 to 2% and having a softening temperature $T_s$ of 390 to 520° C. and a thermal expansion coefficient of $(60$ to $90) \times 10^{-7}$ $K^{-1}$.

10. Plasma display panels comprising a first array of electrodes embedded in a first dielectric layer on a rear substrate, a second array of electrodes embedded in a second dielectric layer on a cover substrate and a pattern of a barrier for defining discharge spaces in between, characterized in that the first dielectric layer on the rear substrate is a reflecting essentially white enamel made by coating the substrate with an enamel composition according to claim 9 and firing at a temperature in the range of 600 to 680° C.

11. Enamel composition according to claim 1, characterized in that the layer forming constituents are dispersed in a liquid or thermoplastic medium.

12. Process for enameling a glass substrate, comprising coating the substrate with an enamel composition consisting essentially of glass layer forming constituents dispersed in a liquid or thermoplastic medium and firing the coated substrate at a temperature in the range of 600 to 680° C., characterized in that the enamel composition of claim 11 is used.

13. Process according to claim 12, characterized in that the coating is performed by screen printing followed by drying.

14. Plasma display panels comprising a first array of electrodes embedded in a first dielectric layer on a rear substrate, a second array of electrodes embedded in a second dielectric layer on a cover substrate and a pattern of a barrier for defining discharge spaces in between, characterized in that the first dielectric layer on the rear substrate is a reflecting essentially white enamel made by coating the substrate with an enamel composition according to claim 11 and firing at a temperature in the range of 600 to 680° C.

15. Enamel composition according to claim 11, characterized in that it consists essentially of 60 to 80% by wt. of layer forming constituents and 40 to 20% by wt. of a liquid printing medium containing a polymer binder and at least a solvent system.

16. Plasma display panels comprising a first array of electrodes embedded in a first dielectric layer on a rear substrate, a second array of electrodes embedded in a second dielectric layer on a cover substrate and a pattern of a barrier for defining discharge spaces in between, characterized in that the first dielectric layer on the rear substrate is a reflecting essentially white enamel made by coating the substrate with an enamel composition according to claim 15 and firing at a temperature in the range of 600 to 680° C.

17. Plasma display panels comprising a first array of electrodes embedded in a first dielectric layer on a rear substrate, a second array of electrodes embedded in a second dielectric layer on a cover substrate and a pattern of a barrier for defining discharge spaces in between, characterized in that the first dielectric layer on the rear substrate is a reflecting essentially white enamel made by coating the substrate with an enamel composition according to claim 1 and firing at a temperature in the range of 600 to 680° C.

* * * * *